United States Patent
Whiting et al.

(10) Patent No.: US 8,922,433 B2
(45) Date of Patent: Dec. 30, 2014

(54) UNSUPERVISED LEARNING AND LOCATION SYSTEMS FOR TRACKING IN WIRELESS COMMUNICATION SYSTEMS

(75) Inventors: Philip Whiting, New Providence, NJ (US); Aiyou Chen, New Providence, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 771 days.

(21) Appl. No.: 12/870,685

(22) Filed: Aug. 27, 2010

(65) Prior Publication Data
US 2012/0050108 A1      Mar. 1, 2012

(51) Int. Cl.
*G01S 5/02*      (2010.01)

(52) U.S. Cl.
CPC ................... *G01S 5/0252* (2013.01)
USPC ........................................ 342/452; 342/457

(58) Field of Classification Search
CPC ......... G01S 1/042; G01S 5/14; H04W 64/003
USPC ........ 342/452, 457, 463, 464; 455/423, 456.1
See application file for complete search history.

(56) References Cited

U.S. PATENT DOCUMENTS

2008/0057873 A1*   3/2008   Huang et al. ............... 455/67.11
2013/0205313 A1*   8/2013   Kim et al. ........................ 725/14

OTHER PUBLICATIONS

Dempster, A.P. et al., "Maximum Likelihood from Incomplete Data via the EM Algorithm", Journal of the Royal Statistical Society. Series B (Methodological), vol. 39, No. 1. (1977) pp. 1-38.
Chen, A. et al., "An Algorithm for Fast, Model-Free Tracking Indoors", Mobile Computing and Communications Review, vol. 11, No. 3 (Jul. 2007) pp. 48-58.
Chen, A., et al., "UnSupervised Learning and Location Systems with Application to Wireless Based Tracking", (Aug. 23, 2010).

* cited by examiner

*Primary Examiner* — Dao Phan
(74) *Attorney, Agent, or Firm* — Davidson Sheehan LLP

(57) ABSTRACT

The present invention provides a method of unsupervised learning and location for tracking users in a wireless communication system. One embodiment of the method includes forming a signal map of a geographic area using unlabeled values of one or more signals so that the signal map relates locations in the geographic area to values of the signal(s).

16 Claims, 10 Drawing Sheets

UNSUPERVISED LEARNING AND LOCATION SYSTEMS FOR TRACKING IN WIRELESS COMMUNICATION SYSTEMS

BACKGROUND OF THE INVENTION

1. Field of the Invention

This invention relates generally to communication systems, and, more particularly, to wireless communication systems.

2. Description of the Related Art

Wireless communication systems typically include a geographically dispersed network of base stations or access points for providing wireless connectivity to mobile units. The widespread deployment of wireless networks in buildings provides an opportunity to estimate the location of people and objects in real-time for emergency response, protection of corporate assets, and personalized, location-based communications. However, estimating the location of a roaming mobile unit has proven difficult, particularly for mobile units that do not include Global Positioning System (GPS) functionality. Even mobile units that include GPS functionality may be difficult to locate in some circumstances, e.g., when the mobile unit is inside a building or otherwise unable to acquire the necessary satellite signals. These mobile units may therefore not be able to take advantage of location-based services and it may not be possible to locate these users for emergency response.

One type of indoor tracking system uses a "signal map" of the interior space to locate mobile units within the space. Each mobile unit produces a characteristic pattern of signals when it transmits to the network. Entries in the signal map may therefore include a location in the interior space and a characteristic pattern of signals expected to be produced by a mobile unit transmitting from this location. The signal map is indexed by the signal patterns, which can be matched to the received signals. Under reasonable assumptions concerning the signals, the signal map can be employed to locate users within the building. For example, signals from a tracked user can be matched to the entries in the signal map and the entry in signal space closest to the measured signals is taken to determine the location. This method of locating a mobile unit is typically called finger printing or pattern matching.

The conventional fingerprinting method of determining a mobile unit location requires that the signal map be developed manually before attempting to locate any mobile units. One technique for developing a signal map is to have a test user move around the building, make signal measurements at multiple points, and record the location at which each set of measurements is made, i.e. the data includes a signal value that is labeled with the location of the mobile unit used to make the measurement. This approach is time-consuming and laborious because hundreds or even thousands of locations may be involved. Furthermore, the map is expected to be in a constant state of change due to changes in the environment, changes in the location and/or number of access points, and the like. Maintaining the signal map as the signal environment changes requires constant vigilance and regular repetition of the time-consuming and laborious data gathering process used to acquire the labeled location data and create the signal map in the first place.

A second potential solution is to deploy a network of sensors throughout the interior space at known locations. The sensor network would constantly monitor the locating signals and relay them to a central database. The signal data is therefore automatically labeled with the fixed locations of the sensors and so the central database can use the labeled information to maintain the signal map. This procedure relies on costly hardware as well as careful selection of locations to generate the labeled data required to form an accurate map. This approach also requires deployment of a sufficiently large number of sensors to maintain the signal map so that it provides sufficient location accuracy.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for unsupervised learning and location for tracking users in a wireless communication system. One embodiment of the method includes forming a signal map of a geographic area using unlabeled values of one or more signals so that the signal map relates locations in the geographic area to values of the signal(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
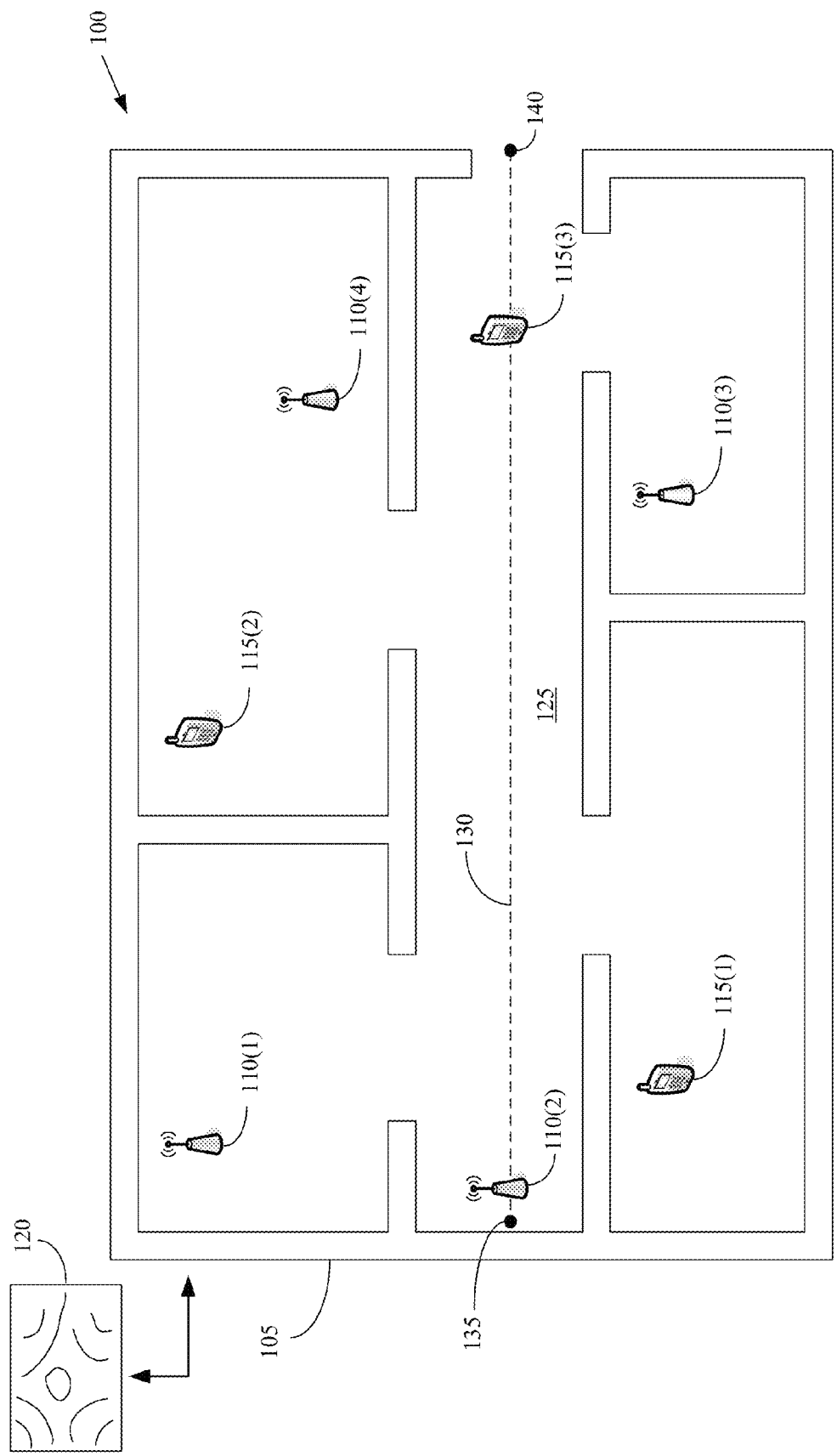
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques that can be used to support unsupervised learning and formation of signal maps in wireless communication systems. Embodiments of these techniques can also be used to locate mobile units within the wireless communication system using the signal maps. Conventional mapping and location systems require labeled location information to generate an indexed signal map. For example, users, mobile units, or other testing devices can be transported to and/or deployed at specific locations within a geographic area. Signals are then labeled using the location information at each location (e.g., the latitude and longitude of the mobile unit when it transmits a test signal) and the labeled signals are used to generate the map. In contrast, embodiments of the techniques described herein use statistical properties of unlabeled signals to construct or develop the signal maps that relate measured values of the signals to their locations. In one embodiment, the signal map can be formed using a mean signal function to indicate the relationship between the location of the mobile unit and one or more signals measured for the mobile unit while at that location. The mean signal function can be determined using unlabeled data under statistical assumptions such as monotonic variation of the mean signal function, continuity of the mean signal function, and the like. Signal mapping can be performed in one dimension or multiple dimensions depending on the particular embodiment. Signal mapping can also be performed dynamically so that the signal map is modified in response to environmental and/or network topology changes indicated by variations in the signals.

FIG. 1 conceptually illustrates a first exemplary embodiment of a wireless communication system 100. In the illustrated embodiment, the wireless communication system 100 is a deployed within building 105. For example, the wireless communication system 100 may be a WiFi system that uses one or more access points 110 to provide wireless connectivity to users or mobile units 115 substantially within the boundaries of the building 105. Techniques for implementing and/or operating wireless communication systems such as WiFi systems are known in the art and in the interest of clarity only those aspects of implementing and/or operating the wireless communication system 100 that are relevant to the claimed subject matter will be discussed herein. Furthermore, persons of ordinary skill in the art having benefit of the present disclosure should appreciate that the techniques described herein are applicable to other types of wireless communication systems implemented in other geographic areas and that the exemplary WiFi system is only used for illustrative purposes. For example, the techniques described herein may be used in wireless communication systems that implement other wireless communication standards and/or protocols such as various IEEE 802 standards and/or protocols.

Measurements of various values of signals associated with communication between the access points 110 and the mobile units 115 can be performed in the wireless communication system 100. Exemplary signals that can be measured include measures of the signal strength for a signal transmitted between the access point 110 and the mobile unit 115 (such as a Received Strength Signal Indicator, RSSI) and the round-trip delay for a signal transmitted between an access point 110 and the mobile unit 115. In the illustrated embodiment, the signals may be unlabeled. As is well known in the art, data can be labeled or unlabeled. Labeled data consists of a set of training examples. In supervised learning, each training example is a pair consisting of an input object (typically a vector) and an output value (also called the supervisory signal or label). Unlabeled data includes the input object but the output value is not a part of the data. Unsupervised learning techniques can be applied to identify relations implied by the unlabeled data. As used herein, the term "unlabeled" will be understood to refer to signals that are not specifically associated with (e.g., labeled with) the location of a mobile unit 115 when the values of the signals are determined. For example, a mobile unit 115 may or may not be able to determine its location (e.g., its latitude and longitude) when communicating with a base station 110. Regardless of the capabilities of the mobile unit 115, unlabeled data includes information indicating the value of the signal but does not include location information such as latitude/longitude, timestamps associated with the measurement, and the like. In contrast, labeled data typically includes the location information so that the value of the signal is "labeled" with the location information that indicates the location of the mobile unit 115.

A signal map 120 that relates values of the signals to locations of the mobile units 115 can be formed using unlabeled measurements of signals based on transmissions between the access points 110 and the mobile units 115. In one embodiment, the wireless signals are collected without at any instant determining the position at which they are being generated or received, e.g., by a mobile unit 115. This approach may therefore avoid the need to deploy large numbers of sensors at fixed and known locations or to use manual collection techniques to provide and/or update large numbers of measurements taken at known locations. Instead, statistical properties of values of the signals can be used to construct a new signal map 120 or alternatively to dynamically maintain/update an existing signal map 120 using signals transmitted during operation of the wireless communication system 100, such as the signals that are used to locate mobile units 115 using the current signal map 120.

In one embodiment, a one-dimensional signal map 120 can be used to locate mobile units 115. For example, a one-dimensional signal map 120 can be constructed using measured values of signals associated with the access point 110 (2) and then used to determine the location of the mobile unit 115(3) in a hallway 125 of the building 105 using signals associated with transmissions between the access point 110 (2) and the mobile unit 115(3). The relation between the value of the signal and the location is determined or estimated using a mean signal function, g, which is defined herein as the unknown mapping between the mean signal values at a location and the location itself. For example, a signal map for the unit interval [0.1] can be determined using unlabeled data when the mean signal function is monotonically increasing or decreasing. In that case, $\forall U \in [0,1]$ and the signal Y is given by:

$$Y=g(U)+Z$$

where $Z \approx N(0,\sigma^2)$ represents noise that has a standard deviation of $\sigma^2$, which is presumed to be known in this example, and the signal is assumed to be unbiased so that it has a mean error of 0. The inventors have demonstrated the following theorem that implies that the mean signal function (g) can be determined to arbitrary accuracy using statistical procedures.

Theorem 1: If g is a monotone increasing (or decreasing) function, then g can be uniquely identified from the marginal distribution of Y.

In probability theory, the characteristic function of a scalar real random variable is the expected (theoretical mean) of a complex valued quantity determined by a scalar real parameter (t). From the proof of Theorem 1, the inventors have demonstrated that since the characteristic function ($\phi$) of the signal Y can be determined, the characteristic function C(t) of the random variable g(U) can also be determined:

$$\phi(t)=C(t)e^{t^2\sigma^2/2}=E[e^{iYt}].$$

Inverting this equation provides the characteristic function C(t) of the random variable g(U):

$$C(t)=\phi e^{-t^2\sigma^2/2}.$$

The cumulative distribution function (G) can therefore also be determined within the bounds $(g_L, g_R)$ of the function g.

$$G(x), x \in [g_L, g_R]$$

Figure 8:
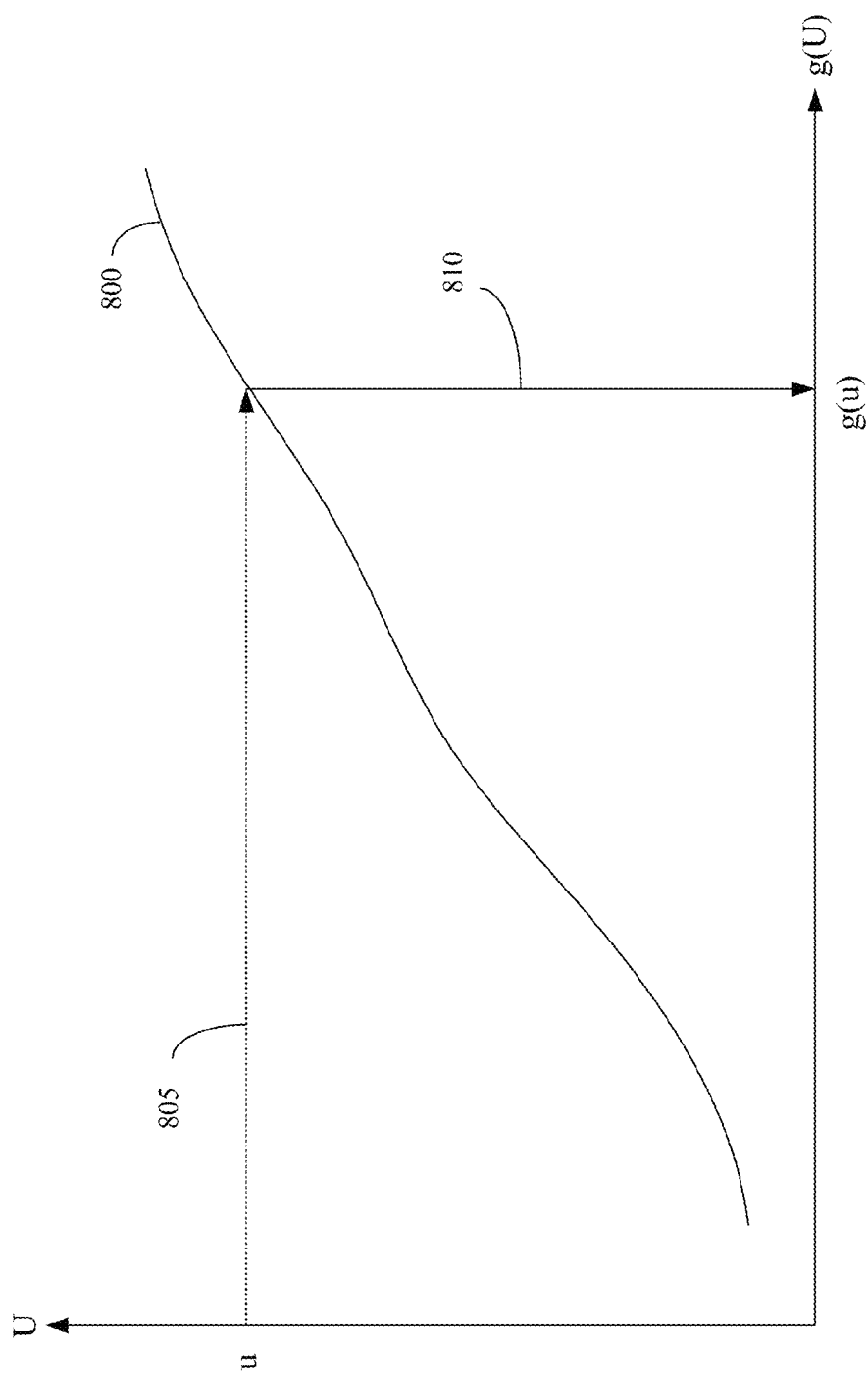
FIG. 8 depicts one exemplary embodiment of a cumulative distribution function.

To obtain the mean value associated with the position for $u \in [0,1]$, a solution for the characteristic value can be determined using:

$$G(g(u))=u,$$

which has a unique solution if G is continuous and strictly increasing. A sequence of pairs:

$$(g(u_m),u_m); m=1,\ldots,M$$

constitutes a one-dimensional signal map. One embodiment of a geometric solution for g(u) is shown in FIG. 8 and related discussion later in the text. The signal map can be interpolated to allow increased measurement accuracy. In one embodiment, pairs are assumed to be normal but this is not required and other error distributions may alternatively be used. In one embodiment the assumption of 0 mean errors with finite variance $Z \approx N(0,\sigma^2)$, independent of position, may be sufficient. However, in alternative embodiments, the cumulative distribution function of the error distribution may not be needed nor may the precise value of the standard deviation be necessary to determine the signal map.

Figure 2:
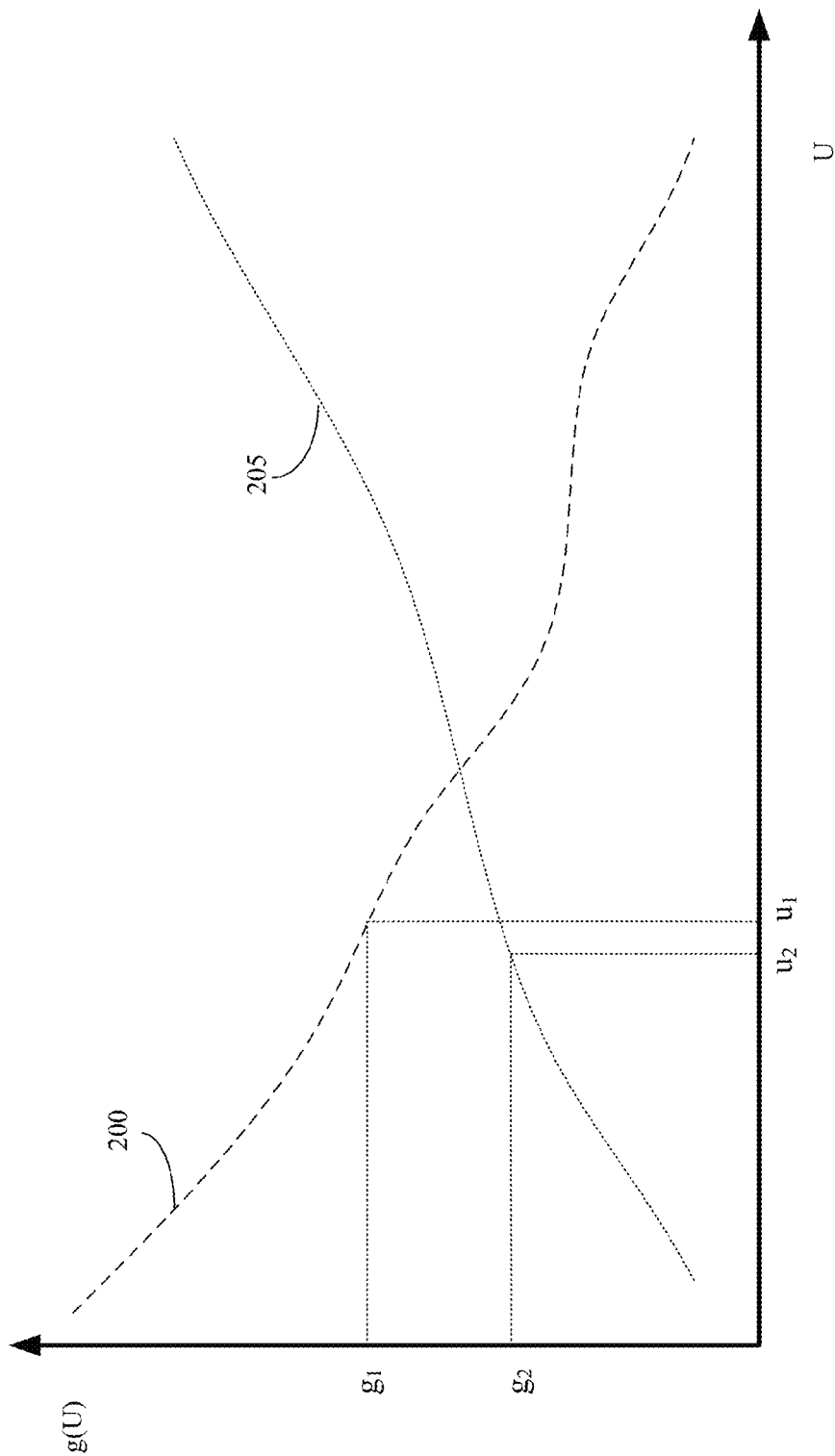
FIG. 2 conceptually illustrates exemplary embodiments of mean signal values for two different signals.

FIG. 2 conceptually illustrates exemplary embodiments of mean signal functions 200, 205. The vertical axis indicates the value of the mean signal function (g) in arbitrary units and the horizontal axis indicates the value of the random variable (U) in arbitrary units. In the illustrated embodiment, the mean signal function 200 is monotonically decreasing and continuous. For example, the mean signal function 200 may indicate signal strength measured along a hallway so that it decreases monotonically and continuously with increasing distance from the access point. In the illustrated embodiment, the mean signal function 205 is monotonically increasing and continuous. For example the mean signal function 205 may indicate round-trip delay measured along a hallway so that it increases monotonically and continuously with increasing distance from the access point.

The mean signal functions 200, 205 can be used separately, together, and/or in combination with other information to estimate the location of mobile units based on measured signal values. For example, the mean signal function 200 may indicate that a measured value of the received signal strength for a mobile unit ($g_1$) corresponds to the location $u_1$. Since the mean signal function 200 is being used as the indicator of location, the location $u_1$ indicates the most likely location of the mobile unit although mobile unit may not be precisely at this location, at least in part because the mean signal function 200 is derived from an actual distribution of measurements that is spread about the mean signal function 200. For another example, the mean signal function 205 may indicate that a measured value of the received signal strength for a mobile unit ($g_2$) corresponds to the location $u_2$. In the illustrated embodiment, the two mean signal functions 200, 205 are shown using the same vertical axis but persons of ordinary skill in the art having benefit of the present disclosure should appreciate that the mean signal functions 200, 205 may have different dimensions or scales. In one embodiment, if the measured values ($g_1, g_2$) are associated with the same mobile unit at substantially the same time, information for both values can be used to estimate the location of the mobile unit. For example, the location of the mobile unit may be estimated using an average of the locations $u_1$ and $u_2$. Error estimates may also be determined for the estimated locations using known statistical techniques.

Referring back to FIG. 1, measurements of values of the signals can be collected upon a one-dimensional line, such as the line 130. The line 130 therefore constitutes a bounded set of locations and in this case the line 130 is bounded by its endpoints 135, 140. Lines, collections of lines, or other bounded sets of locations may be referred to herein as map sections. Portions of the map sections may be referred to as map subsections. In one embodiment, the measured values can be selected from among values collected throughout the building 105. For example, a camera or other device or criteria can be used to identify when a mobile unit 115 is within the hallway 125 and therefore proximate the line 130 or other part of the map section. Signals associated with transmissions that occur when the mobile unit 115 is within the hallway 125 may therefore be associated with the line 130 or other map section.

Mobile units 115, persons, automata, or their equivalent may move up and down the line 130 making measurements periodically or at other intervals. The measurements may be made only when the devices are proximate the line 130 or alternatively measurements can be made anywhere but other criteria can be used to determine when the devices are proximate the line 130 so that these measurements can be selected from the larger pool of measurements. The points at which the measurements are taken along the line 130 may correspond to a known probability distribution that has mass (i.e., is non-zero) everywhere along the line 130. For example, the probability distribution may indicate that measurements are taken at random locations with equal probability at every point along the line 130. In one embodiment, the probability distribution of users along the line 130 may be determined by the context, environment, usage patterns, and the like. In that case, the determined probability distribution is the one used to determine the signal map. Alternatively, the probability distribution of users along the line 130 may not be determined by the context, environment, usage patterns, and the like. In that case, alternative probability distributions can be used. The sequence of the measurements may not be needed nor may time stamping be necessary to determine the mean signal function used to form the signal map 120.

The mean signal function can then be inferred from the values of the measurements. In one embodiment, the mean signal function is inferred assuming a monotone step function. However, persons of ordinary skill in the art having benefit of the present disclosure should appreciate that alternative embodiments may use alternative functions including continuous monotone functions. Moreover, in practice, even if the mean signal function is strictly monotone and continuous it may be approximated with a step function to simplify the analysis. In the illustrated embodiment, the mean signal function is inferred using a stochastic model such as a mixture model. A mixture model is a probabilistic model for density estimation using a mixture distribution made up of a plurality of different distributions. In the illustrated embodiment, the likelihood of a particular measurement $y_l$, $l=1, \ldots, n$ is given by:

$$L(y_l | g, \pi) = \sum_{k=1}^{K} \pi_k \phi_\sigma(y_l - g_k)$$

where $g_1 < g_2 < \ldots < g_k$ are the K unknown step values, $\phi_\sigma$ is the density of a zero mean normal with variance $\sigma^2$, and $\pi_k$ is the probability of a measurement being taken in step k. The ordered vector measurement is denoted by g and $\phi$ is the zero mean unit normal density. In this embodiment, a random mean with independent normal errors is used. However, in alternative embodiments other predetermined or selected probability distributions may be used as discussed herein.

Different inference techniques can be used to infer the mean signal function. Exemplary inference techniques include maximum likelihood, local smoothing, and the ordering method. When maximum likelihood inference techniques are used, a likelihood function provides knowledge of the error distribution but not the parameters of the error distribution. Given the distribution, the unknown parameters can be inferred from the measured values. For example, when $\pi_k$ is known and given by equal step length values $$\pi_k = \frac{1}{K},$$

$k=1, \ldots, K$ and $\sigma$ is also known, the maximum likelihood technique can be used to determine the unknown assignment of measurements to steps. An indicator function A(k,l) can be defined to indicate whether a measurement (l) has been taken on step (k). Inference can then proceed using the well-known Expectation-Maximization (EM) algorithm in which the expectation is for the indicator function (A) and maximization is for the mean signal function (g).

In one alternative embodiment, local smoothing can be used to infer the mean signal function. Local smoothing typically uses less information than maximum likelihood because the error distribution need not be known. However, local smoothing uses the known time order or sequence of the measurements and assumes that the change in position and underlying signal means are small. The assumed small change in position may correspond to an assumption that the measurement device is not moving rapidly. Once smoothing has been performed, the smoothed values may be ordered to yield an estimate for the mean signal function. In yet another alternative embodiment, the ordering method is used to infer the mean signal function using an ad hoc algorithm in which the signal measurements are simply ordered to infer the mean signal function.

Figure 3A:
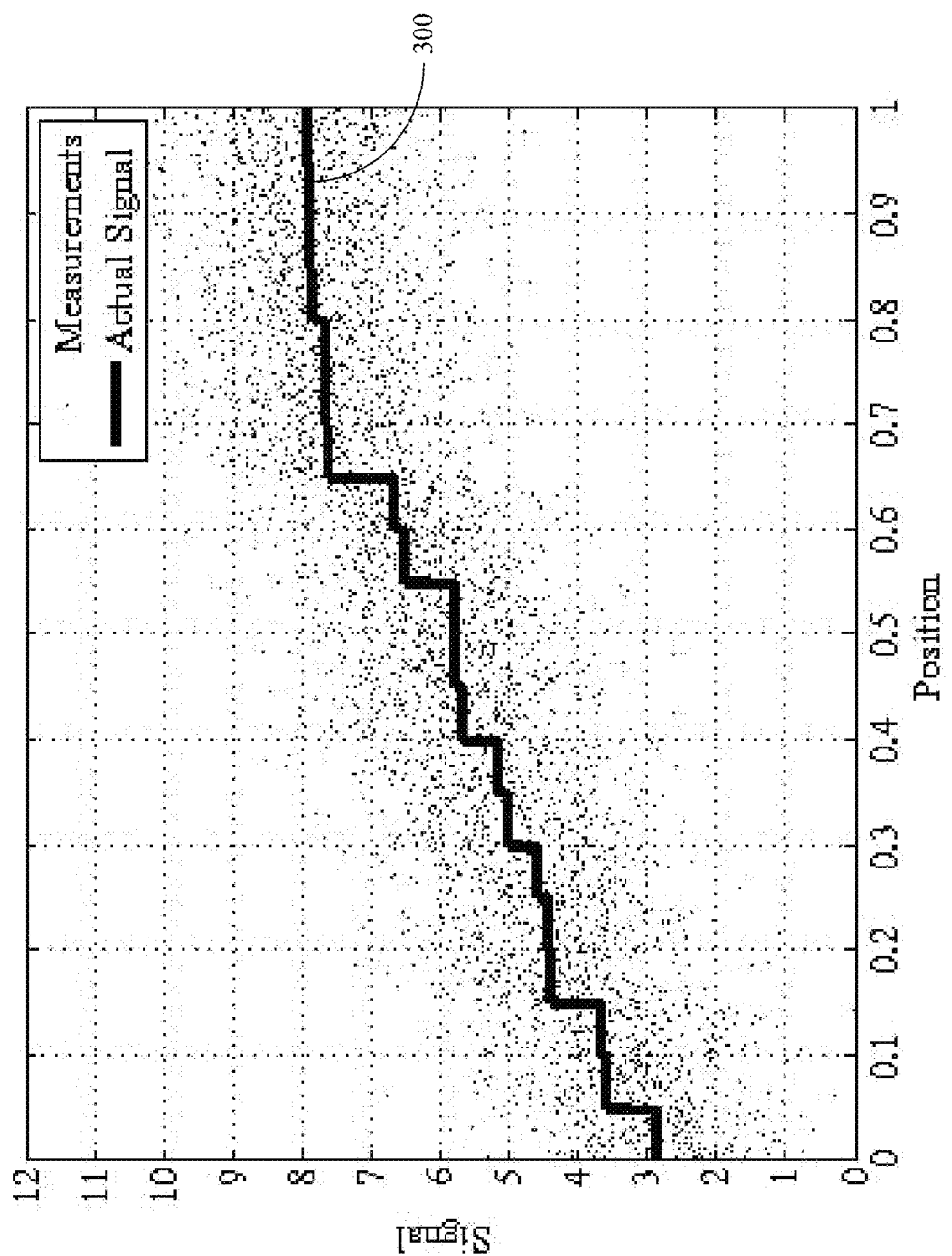
FIGS. 3A and 3B show simulated results of the estimation of a monotone curve based on unlabeled signal data.
Figure 3B:
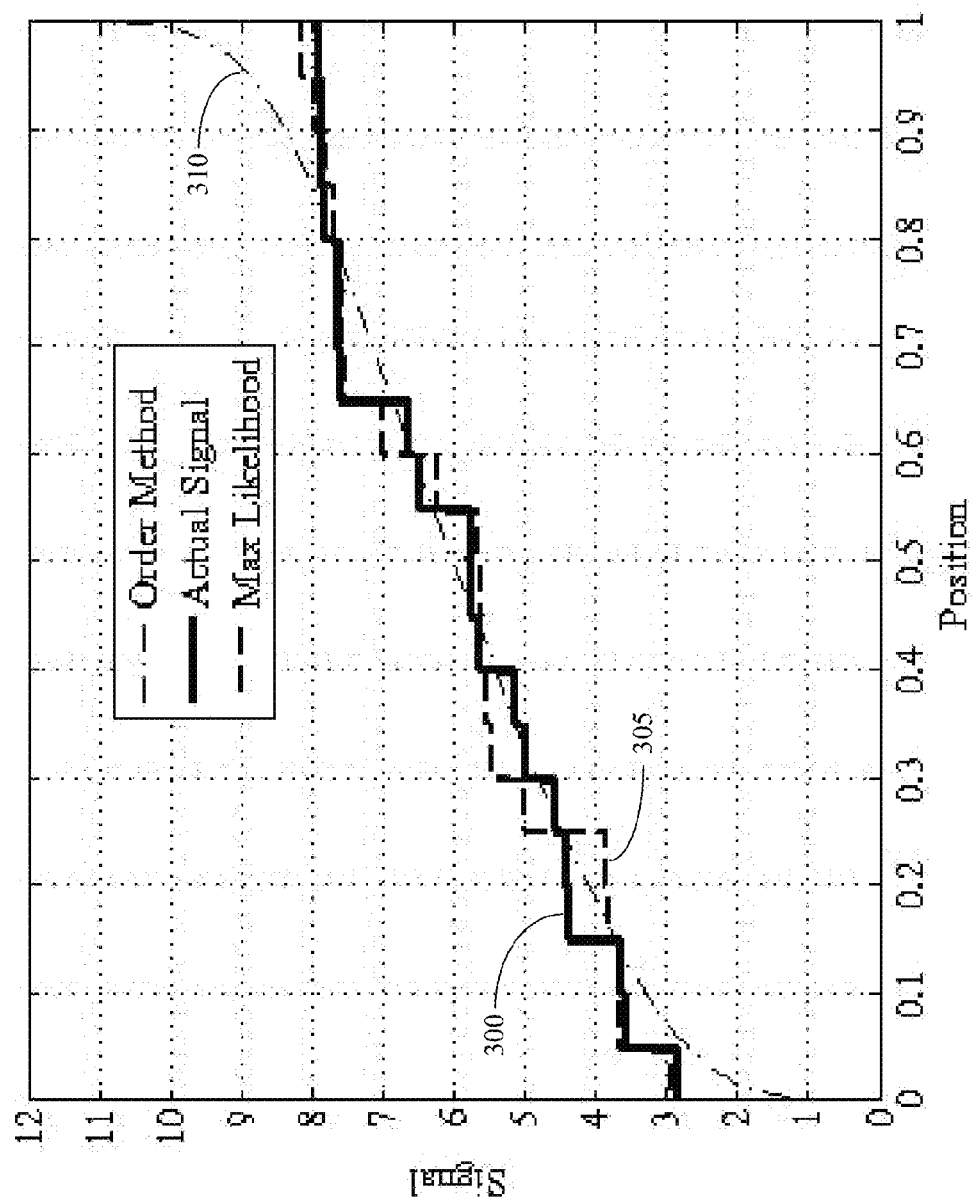

FIGS. 3A and 3B show simulated results of the estimation of a monotone curve based on unlabeled signal measurements. In the illustrated embodiment, a one-dimensional path is simulated using 2000 measurements taken at random and at unknown locations along the path [0,1]. Individual measurements are indicated by the dots in FIG. 3A and the actual mean values are indicated by the curve 300. The curve 300 indicates the actual relationship between the signal and the user's position along the path. Results of simulations of different embodiments of the unsupervised learning techniques described herein are depicted in FIG. 3B. The estimated monotone step function returned by applying the maximum likelihood method using the EM algorithm is shown in the curve 305. The curve 305 is fairly accurate along most of its length. The curve 310 shows the estimate generated using ordering of the measurements. The simple ordering approach generates gross errors most notably at the endpoints.

Figure 4A:
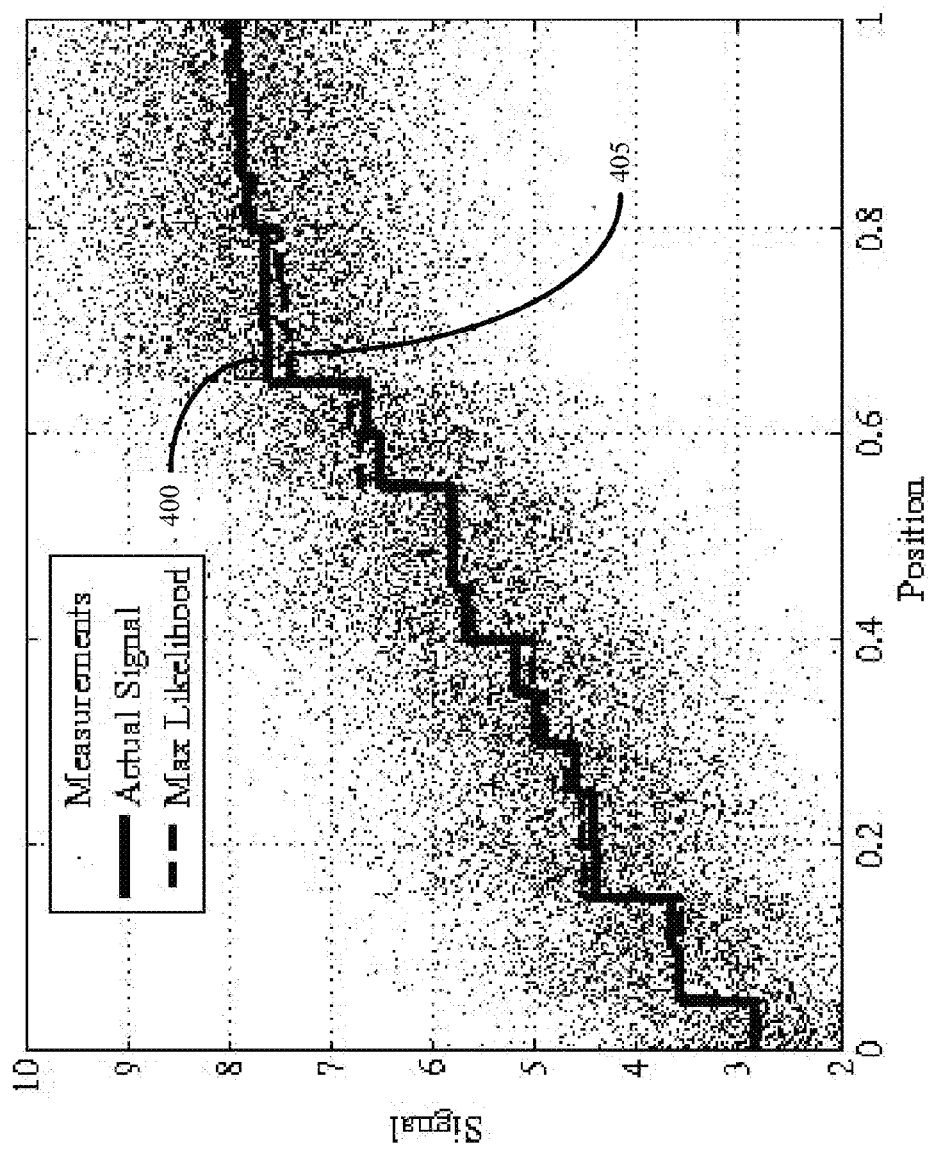
FIGS. 4A and 4B show another set of simulated results of the estimation of a monotone curve based on unlabeled signal data.
Figure 4B:
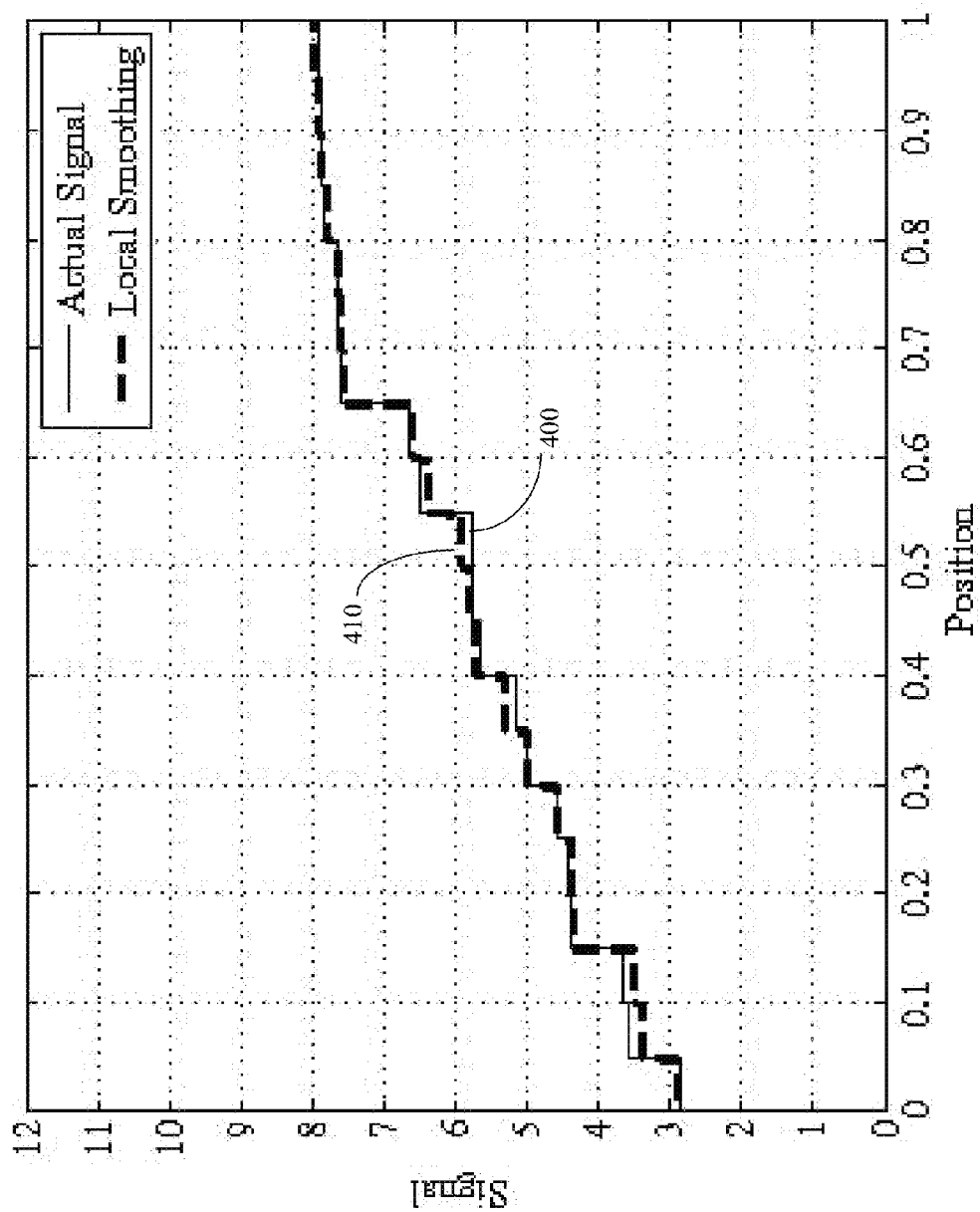

FIGS. 4A and 4B show another set of simulated results of the estimation of a monotone curve based on unlabeled signal measurements. In the illustrated embodiment, a one-dimensional path is simulated using 10,000 measurements taken at random and at unknown locations along the path [0,1]. Individual measurements are indicated by the dots in FIG. 4A and the actual mean values are indicated by the curve 400. The curve 400 indicates the actual relationship between the signal and the user's position along the path. Results of simulations of different embodiments of the unsupervised learning techniques described herein are depicted in FIG. 4B. Increasing the number of measurements results in a more accurate estimate of the underlying mean signal, as shown in FIG. 4B. The estimated monotone step function returned by applying the maximum likelihood method using the EM algorithm is shown in the curve 405. The curve 405 is fairly accurate along most of its length. The results of the smoothing approach are shown in the curve 410, which is a closer approximation to the curve 400 that uses knowledge of the sequence in which the measurements were taken to improve the estimation process. Smoothing does not require knowledge of the error statistics.

Figure 5:
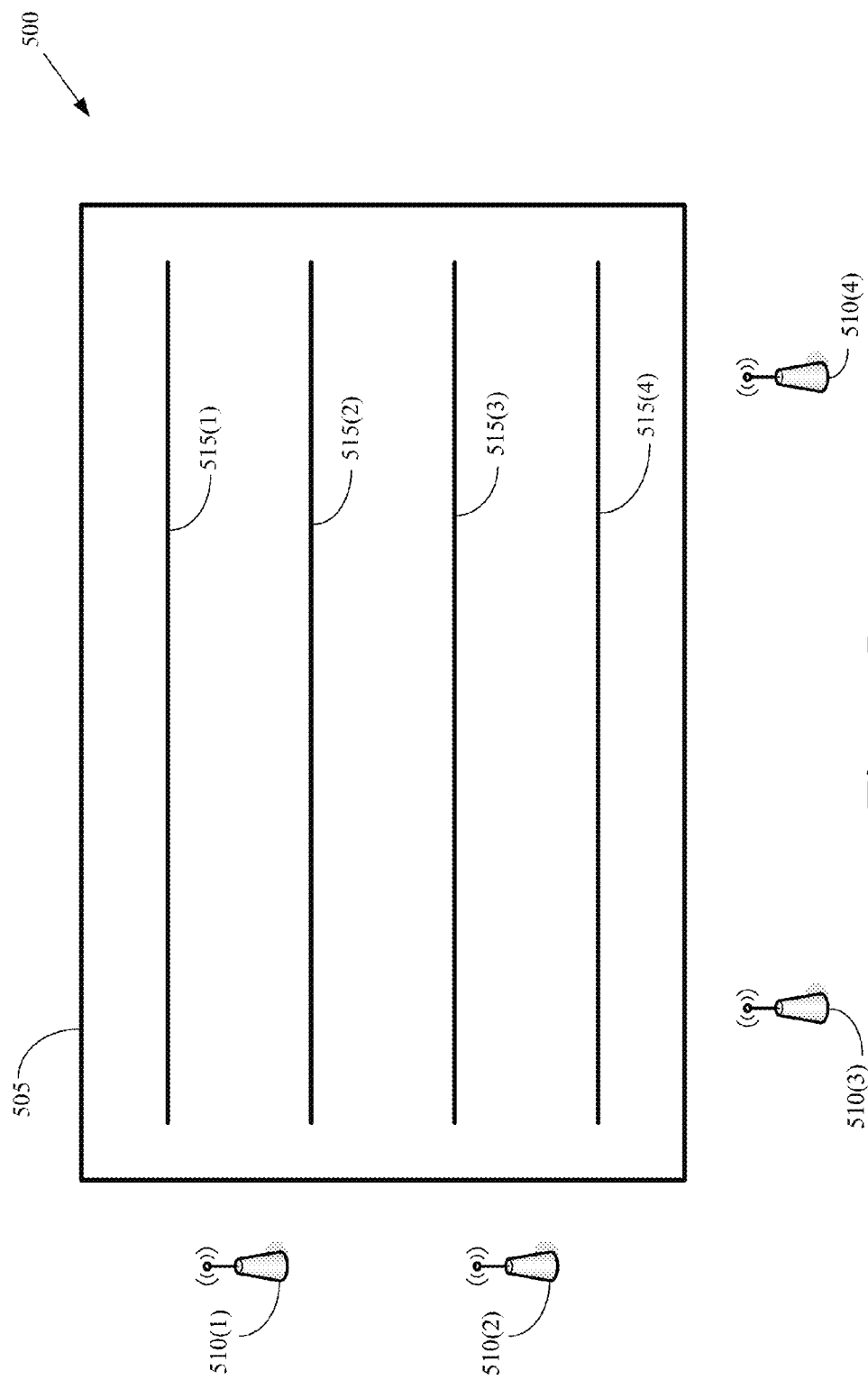
FIG. 5 conceptually illustrates a second exemplary embodiment of a wireless communication system.

FIG. 5 conceptually illustrates a second exemplary embodiment of a wireless communication system 500. In the illustrated embodiment, the wireless communication system 500 is a deployed to provide wireless connectivity within building 505. For example, the system 500 can use one or more access points 510 to provide wireless connectivity to users substantially within the boundaries of the building 505. To locate mobile units within the two-dimensional space of the building 505 (or 3-D in other embodiments), a map section made up of multiple lines or other bounded sets of locations is used. In the illustrated embodiment, the two-dimensional space of the building 505 is partitioned using a map section that includes a set of parallel lines 515. However, in alternative embodiments, other bounded sets of locations can be used to form the map section. The map subsections should not overlap so that they do not have any points in common. Constructing a signal map from the measurements associated with (e.g., proximate to) the lines 515 can therefore be done under the assumption that the map subsections (the lines 515 in the illustrated embodiment) do not cross so that they do not have any points in common. In one embodiment, this assumption is satisfied for ordered pairs of signals $\tau=(\tau_1,\tau_2)$ associated with the user at a location as long as the ordered pairs are not repeated along different lines 515. For example, an ordered pair of measured values of round-trip delays from a user to the base stations 510(1-2) should be different for each point upon the lines 515. One alternative criterion is to require that when one ordered pair $\tau$ is on one line 515 and another ordered pair $\bar{\tau}$ is on another line 515 the magnitude of the difference should satisfy the criterion $\|\tau-\bar{\tau}\|^2>\Delta>0$ so that the Euclidean signal distance is greater than some known lower bound $\Delta$.

Measurements of the values of or more signals can then be collected and associated with the lines 515. The distribution of the positions at which measurements are taken is known or can be selected. For example, measurements may have an equal probability of being taken on any line 515 within the map section and may be uniformly distributed along its length. However, in alternative embodiments, other distributions, which may be non-random and/or non-uniform, also admit inference of the mean signal function and may be selected in advance, where this is allowed as discussed herein. Continuity of the mean signal function for multiple signals (such as the timing pairs $\tau=(\tau_1,\tau_2)$) may be used as a means to show that the mean signal function is identifiable. Time sequenced measurements and/or time stamping are not required to infer the mean signal function in such cases. Consequently, the mean signal function may be inferred using unlabelled values of the signal as discussed herein. The endpoints of the lines 115 can then be confirmed as identifiable (for example as being extremes of round trip times in accordance with their proximity to specific access points or by equivalent means) to complete identification and therefore inference. For example, local smoothing (or other clustering techniques) can be used to assign measurements to the various lines. Maximum likelihood and the EM algorithm can be used to determine the mean signal function in the absence of time stamping and sequencing. In one embodiment, the EM algorithm may be modified at the maximization step to take into account constraints on the mean signal function and (if available) smoothness conditions on this function.

Figure 6:
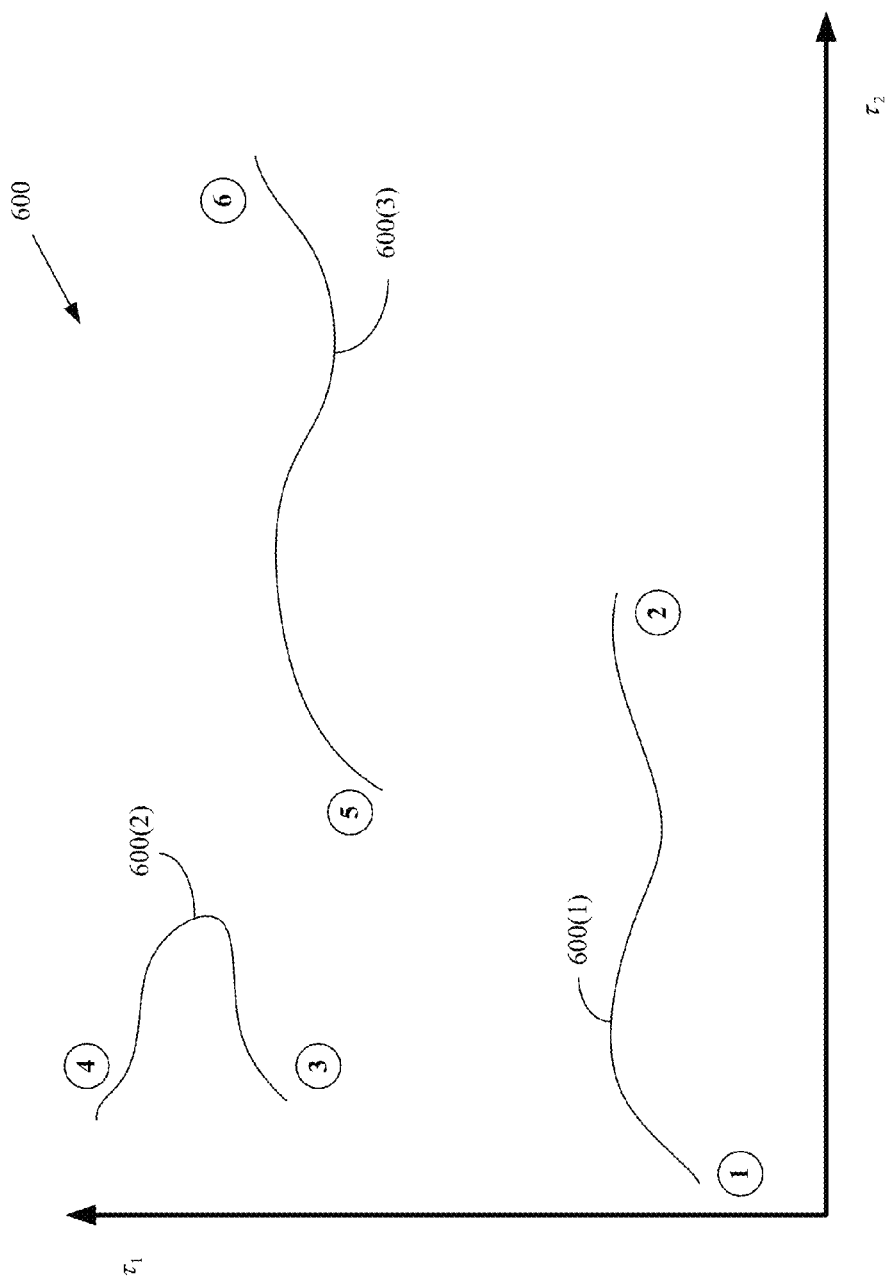
FIG. 6 conceptually illustrates one exemplary embodiment of a discontinuous distribution of measured values of a signal.

FIG. 6 conceptually illustrates one exemplary embodiment of a discontinuous distribution 600 of measured values. In the illustrated embodiment, the distribution 600 indicates the actual mean timing and includes three discontinuous segments 605 that indicate values of measured pairs $\tau=(\tau_1,\tau_2)$ of a signal. The correct sequence proceeds from the circled 1 to the circled 2 in segment 605(1), from the circled 3 to the circled 4 in segment 605(2), and from the circled 5 to the circled 6 in segment 605(3). However, an unsupervised learning system using unlabeled data could alternatively conclude that the direction of each of the segments 605 could be reversed or that the segments 605 proceed in different orders.

In one embodiment, the mean signal function can be inferred from unlabeled values of the signal even where there are discontinuities in the mean signal function and where the end points of such discontinuities cannot be identified. In that case, time stamping or sequencing of the measured values of the signals can be used to identify the mean signal function. For example, time stamping can be used to identify the correct order when the segments 605 are discontinuous. For example, measurements at one end of a discontinuous segments 605 should be followed by measurements that the adjacent location for the other side of the signal discontinuity. The endpoints can then be matched statistically. Directions within each of the segments 605 can be determined using knowledge of the signals. For example, the end of a segment 605 could correspond to the longest round-trip time for a particular base station or alternatively the beginning of a segment 605 to correspond to the smallest round-trip time for a particular base station. Once the endpoints have been identified, smoothing heuristics such as the locally weighted scatterplot smoothing (LOESS) heuristic are suitable for inferring the mean signal function.

Figure 7:
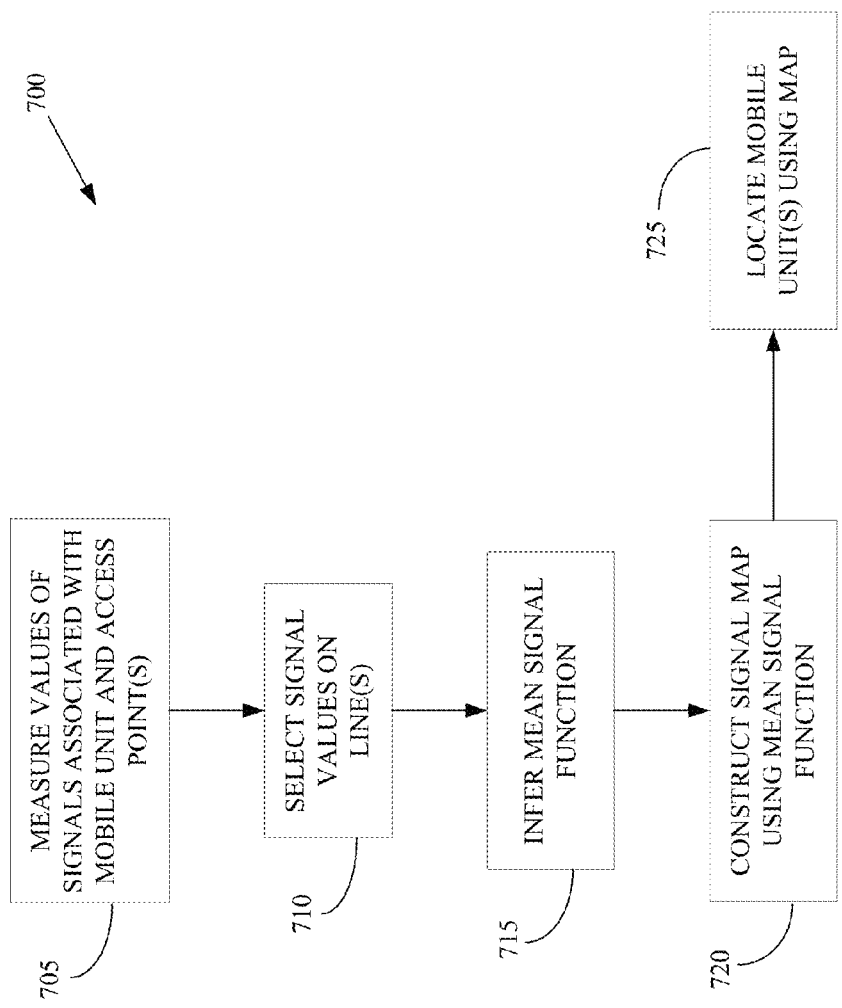
FIG. 7 conceptually illustrates one exemplary embodiment of a method for constructing a signal map and locating mobile units within a geographic area using the signal map.

FIG. 7 conceptually illustrates one exemplary embodiment of a method 700 for constructing a signal map and locating mobile unit within a geographic area using the signal map. In the illustrated embodiment, values of one or more signals are measured (at 705) based on signals transmitted between one or more mobile units and one or more access points. Exemplary signals that may be measured (at 705) include, but are not limited to, round-trip time delays and signal strength measurements. Values of the measurements can then be associated with a map section that includes one or more bounded sets of locations such as lines. In the illustrated embodiment, signal values corresponding to the map section within the geographic area are selected (at 710). A mean signal function can be inferred (at 715) using statistical properties of the measured values.

A signal map can then be constructed (at 720) using the mean signal function (g) that indicates a relationship between values of the characteristic function (Y) and locations within the map section. For example, the mean signal function g(u) can be determined (at 715) by dividing by the characteristic function for a normal with mean 0 and variance $\sigma^2$. The uniqueness property then allows the CDF (G) of g(U) to be determined. The value of g can then be determined (at 720) at any point in the map section. For example, FIG. 8 depicts one exemplary embodiment of the CDF 800. The vertical axis is probability in arbitrary units and the horizontal axis is g(u) in arbitrary units. To get g(u), one goes to u on the vertical axis and along to the CDF G (following the arrow 805) and then vertically down (following the arrow 810) to read off g(u), as depicted in FIG. 8. The signal map indicates a relationship between the measured values (or combinations thereof) and the location within the geographic area. Mobile units can then be located (at 725) by determining a value of the signal when the mobile unit is at the location and using the signal map to estimate the location based upon the value of the signal. The locations of mobile units that are not directly on a map section or map subsection can be determined (at 725) by interpolating between locations in the map section/subsection or extrapolating from locations in the map section/subsection.

In one embodiment, the signal map is constructed (at 720) using measured values that have been collected in a previous time interval. The signal map can then be used to locate (at 725) mobile units at times following this time interval. However, changes in the environment and/or the topology of the wireless communication system can cause the signal map to become out of date and therefore provide incorrect locations. Embodiments of the unsupervised learning techniques, such as the method 700, can therefore be applied to generate signals for wireless communication system that is in operation. For example, if the wireless communication system is using an initial signal map (e.g., a signal map generated using conventional field testing or a signal map generated using embodiments of the techniques described in the present application), embodiments of the method 700 can be used to update the signal map. In one embodiment, measurements of the signal values may be collected without determining the locations of the mobile units providing the signals. Measurements taken on one or more bounded sets of locations, such as a map section comprised of multiple non-intersecting lines, can be selected (at 710) and used to construct (at 715, 720) the new map. The probability distribution of the users within the bounded set of locations can be acquired, if necessary, by analysis of the previous movements within the location area or its equivalent.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    forming a signal map of a geographic area using unlabeled values of at least one signal so that the signal map relates locations in the geographic area to values of said at least one signal.

2. The method of claim 1, wherein forming the signal map using the unlabeled values of said at least one signal comprises forming a signal map using values of said at least one signal that are determined for transmissions between at least one mobile unit and at least one access point, and wherein the values of said at least one signal are not labeled with location information for said at least one mobile unit.

3. The method of claim 1, wherein forming the signal map comprises forming a signal map relating locations in the geographic area to values of at least one of a round-trip delay or a received signal strength.

4. The method of claim 1, wherein forming the signal map comprises determining at least one of a mean signal function, a cumulative distribution function, or a characteristic function that relates the locations in the geographic area to the values of said at least one signal.

5. A method, comprising:
    forming a signal map of a geographic area using unlabeled values of at least one signal so that the signal map relates locations in the geographic area to values of said at least one signal, wherein forming the signal map comprises forming the signal map using values of said at least one signal associated with at least one bounded continuous set of locations.

6. The method of claim 5, wherein said at least one bounded continuous set of locations comprises at least one line bounded by two endpoints.

7. The method of claim 5, wherein forming the signal map comprises selecting measured values of said at least one signal that are associated with said at least one bounded continuous set of locations, and wherein the measured values of said at least one signal are drawn from a known probability distribution on said at least one bounded continuous set of locations.

8. The method of claim 7, wherein selecting the measured values of said at least one signal comprises selecting measured values of said at least one signal that are at least one of monotonic or continuous on said at least one bounded continuous set of locations.

9. The method of claim 5, wherein forming the signal map comprises forming the signal map using values of said at least one signal associated with a plurality of bounded continuous sets of locations.

10. The method of claim 9, wherein the bounded continuous sets of locations comprise a plurality of lines bounded by corresponding endpoints.

11. The method of claim 9, comprising defining the plurality of bounded continuous sets of locations so that none of the bounded continuous sets of locations has any points in common.

12. The method of claim 11, comprising selecting measured values of a plurality of signals between at least one mobile unit and a plurality of access points and associating each measured value with one of the bounded continuous sets of locations.

13. The method of claim 12, wherein defining the plurality of bounded continuous sets of locations comprises defining the plurality of bounded continuous sets of locations so that ordered sets of the measured values of these signals between said at least one mobile unit and the plurality of access points are not repeated in different bounded continuous sets of locations.

14. A method, comprising:
    forming a signal map of a geographic area using unlabeled values of at least one signal so that the signal map relates locations in the geographic area to values of said at least one signal; and
    measuring additional values of said at least one signal in a later time interval subsequent to an earlier time interval during which the values of said at least one signal used to form the signal map are collected.

15. The method of claim 14, comprising modifying the signal map using the additional values of said at least one signal.

16. The method of claim 1, comprising determining a location of a mobile unit within the geographic area based on the signal map and at least one measured value of at least one signal associated with the mobile unit.

\* \* \* \* \*